US007104067B2

(12) United States Patent
Bunker

(10) Patent No.: US 7,104,067 B2
(45) Date of Patent: Sep. 12, 2006

(54) COMBUSTOR LINER WITH INVERTED TURBULATORS

(75) Inventor: Ronald Scott Bunker, Niskayuna, NY (US)

(73) Assignee: General Electric Company, Schenectady, NY (US)

(*) Notice: Subject to any disclaimer, the term of this patent is extended or adjusted under 35 U.S.C. 154(b) by 104 days.

(21) Appl. No.: 10/065,495

(22) Filed: Oct. 24, 2002

(65) Prior Publication Data

US 2004/0079082 A1 Apr. 29, 2004

(51) Int. Cl.
*F02C 1/00* (2006.01)
*F02G 3/00* (2006.01)

(52) U.S. Cl. .................................................. 60/752

(58) Field of Classification Search .......... 60/752–760; 126/99 C; 431/350, 185, 9, 353

See application file for complete search history.

(56) References Cited

U.S. PATENT DOCUMENTS 1,848,375 A 3/1932 Muir
2,672,728 A * 3/1954 Stockdale .................... 60/757
2,801,073 A 7/1957 Savage
2,938,333 A 5/1960 Wetzler
3,229,763 A 1/1966 Rosenblad
3,344,834 A * 10/1967 Feinman et al. ............ 431/353
3,349,558 A * 10/1967 Smith .......................... 60/754
3,572,031 A 3/1971 Szetela
3,664,928 A 5/1972 Roberts
3,899,882 A 8/1975 Parker
4,158,949 A 6/1979 Reider
4,184,326 A 1/1980 Pane, Jr. et al.
4,236,378 A * 12/1980 Vogt ............................ 60/757
4,259,842 A * 4/1981 Koshoffer et al. ............ 60/757
4,380,906 A * 4/1983 Dierberger ................... 60/757
4,480,436 A * 11/1984 Maclin ........................ 60/796
4,597,258 A * 7/1986 Harris ......................... 60/796
4,655,044 A * 4/1987 Dierberger et al. ........... 60/753
4,686,823 A * 8/1987 Coburn et al. ................ 60/800
4,690,211 A * 9/1987 Kuwahara et al. .......... 165/177
4,715,436 A * 12/1987 Takahashi et al. .......... 165/133
4,838,031 A 6/1989 Cramer
5,024,058 A 6/1991 Shekleton et al.
5,327,727 A * 7/1994 Ward ........................... 60/757
5,353,865 A 10/1994 Adiutori et al.
5,361,828 A 11/1994 Lee et al.
5,363,654 A 11/1994 Lee
5,392,596 A * 2/1995 Holsapple et al. ............ 60/800
5,419,039 A 5/1995 Auxier et al.
5,421,158 A 6/1995 Stenger et al.
5,460,002 A 10/1995 Correa
5,577,555 A * 11/1996 Hisajima et al. ............ 165/133
5,651,662 A 7/1997 Lee et al.

(Continued)

FOREIGN PATENT DOCUMENTS

JP 63-280390 12/1986

(Continued)

OTHER PUBLICATIONS

"Corporate Research and Development Technical Report Abstract Page and Sections 1-2," Bunker et al., Oct. 2001.

(Continued)

*Primary Examiner*—William H. Rodriguez
(74) *Attorney, Agent, or Firm*—Nixon & Vanderhye P.C.

(57) ABSTRACT

A combustor liner for a gas turbine, the combustor liner having a substantially cylindrical shape; and a plurality of axially spaced circumferential grooves formed in an outside surface of the combustor liner.

9 Claims, 7 Drawing Sheets

U.S. PATENT DOCUMENTS

| | | | | |
|---|---|---|---|---|
| 5,660,525 | A | 8/1997 | Lee et al. | |
| 5,681,144 | A | 10/1997 | Spring et al. | |
| 5,695,321 | A | 12/1997 | Kercher | |
| 5,724,816 | A | 3/1998 | Ritter et al. | |
| 5,738,493 | A | 4/1998 | Lee et al. | |
| 5,758,503 | A | 6/1998 | Dubell et al. | |
| 5,797,726 | A | 8/1998 | Lee | |
| 5,822,853 | A | 10/1998 | Ritter et al. | |
| 5,933,699 | A | 8/1999 | Ritter et al. | |
| 5,975,850 | A | 11/1999 | Abuaf et al. | |
| 6,026,801 | A * | 2/2000 | Barkan | 126/99 C |
| 6,098,397 | A | 8/2000 | Glezer et al. | |
| 6,134,877 | A | 10/2000 | Alkabie | |
| 6,190,120 | B1 | 2/2001 | Thatcher et al. | |
| 6,237,344 | B1 | 5/2001 | Lee | |
| 6,314,716 | B1 | 11/2001 | Abreu et al. | |
| 6,334,310 | B1 | 1/2002 | Sutcu et al. | |
| 6,402,464 | B1 | 6/2002 | Chiu et al. | |
| 6,408,629 | B1 | 6/2002 | Harris et al. | |
| 6,412,268 | B1 | 7/2002 | Cromer et al. | |
| 6,446,438 | B1 * | 9/2002 | Kraft et al. | 60/737 |
| 6,468,669 | B1 | 10/2002 | Hasz et al. | |
| 6,484,509 | B1 * | 11/2002 | Kraft et al. | 60/776 |
| 6,494,044 | B1 | 12/2002 | Bland | |
| 6,504,274 | B1 | 1/2003 | Bunker et al. | |
| 6,526,756 | B1 | 3/2003 | Johnson et al. | |
| 6,530,225 | B1 * | 3/2003 | Hadder | 60/772 |
| 6,589,600 | B1 * | 7/2003 | Hasz et al. | 427/264 |
| 6,663,379 | B1 * | 12/2003 | Carroni et al. | 431/7 |
| 6,722,134 | B1 * | 4/2004 | Bunker | 60/752 |
| 6,772,595 | B1 * | 8/2004 | Martling et al. | 60/737 |
| 2001/0052411 | A1 | 12/2001 | Pantow et al. | |
| 2004/0052643 | A1 * | 3/2004 | Bunker | 416/236 R |
| 2005/0011196 | A1 * | 1/2005 | Leen et al. | 60/772 |
| 2005/0044857 | A1 * | 3/2005 | Glezer et al. | 60/772 |

FOREIGN PATENT DOCUMENTS

| | | |
|---|---|---|
| JP | 408110012 A | 4/1996 |
| JP | 9-217994 | 8/1997 |
| JP | 2001-164901 | 6/2001 |

OTHER PUBLICATIONS

"Corporate Research and Development Technical Report Section 3," Bunker et al., Oct. 2001.

"Thermohydraulics of Flow Over Isolated Depressions (Pits, Grooves) in a Smooth Wall," Afanas'yev et al., Heat Transfer Research, vol. 25, No. 1, 1993.

Mass/Heat Transfer in Rotating Dimpled Turbine-Blade Coolant Passages, Charya et al., Louisiana St. University, 2000.

"Effect of Surface Curvature on Heat Transfer and Hydrodynamics within a Single Hemispherical Dimple," Proceedings of ASME TURBOEXPO 2000, May 8-11, 2000, Munich Germany.

"Concavity Enhanced Heat Transfer in an Internal Cooling Passage," Chyu et al., presented at the International Gas Turbine & Aeroengine Congress & Exhibition, Orlando, Florida, Jun. 2-5, 1997.

"Heat Transfer Augmentation Using Surfaces Formed by a System of Spherical Cavities," Belen'kiy et al., Heat Transfer Research, vol. 25, No. 2, 1993.

"Experimental Study of the Thermal and Hydraulic Characteristics of Heat-Transfer Surfaces Formed by Spherical Cavities," Institute of High Temperatures, Academy of Sciences of the USSR. Original article submitted Nov. 28, 1990.

"Turbulent Flow Friction and Heat Transfer Characteristics for Spherical Cavities on a Flat Plate," Afanasyev et al., Experimental Thermal and Fluid Science, 1993.

"Convective Heat Transfer in Turbulized Flow Past a Hemispherical Cavity," Heat Transfer Research, vol. 25, Nos. 2, 1993.

U.S. Appl. No. 10/010,549, filed Nov. 8, 2001.

U.S. Appl. No. 10/063,467, filed Apr. 25, 2002.

U.S. Appl. No. 10/162,755, filed Jun. 6, 2002.

U.S. Appl. No. 10/162,766, filed Jun. 6, 2002.

U.S. Appl. No. 10/064,605, filed Jul. 30, 2002.

U.S. Appl. No. 10/065,108, filed Sep. 18, 2002.

U.S. Appl. No. 10/065,115, filed Sep. 18, 2002.

U.S. Appl. No. 10/065,814, filed Nov. 22, 2002.

U.S. Appl. No. 10/301,672, filed Nov. 22, 2002.

* cited by examiner

COMBUSTOR LINER WITH INVERTED TURBULATORS

BACKGROUND OF INVENTION

This invention relates generally to turbine components and more particularly to a combustor liner that surrounds the combustor in land based gas turbines.

Traditional gas turbine combustors use diffusion (i.e., non-premixed) flames in which fuel and air enter the combustion chamber separately. The process of mixing and burning produces flame temperatures exceeding 3900 degrees F. Since conventional combustors and/or transition pieces having liners are generally capable of withstanding for about ten thousand hours (10,000), a maximum temperature on the order of only about 1500 degrees F., steps to protect the combustor and/or transition piece must be taken. This has typically been done by film-cooling which involves introducing relatively cool compressor air into a plenum formed by the combustor liner surrounding the outside of the combustor. In this prior arrangement, the air from the plenum passes through louvers in the combustor liner and then passes as a film over the inner surface of the liner, thereby maintaining combustor liner integrity.

Because diatomic nitrogen rapidly disassociates at temperatures exceeding about 3000° F. (about 1650° C.), the high temperatures of diffusion combustion result in relatively large NOx emissions. One approach to reducing NOx emissions has been premix the maximum possible amount of compressor air with fuel. The resulting lean premixed combustion produces cooler flame temperatures and thus lower NOx emissions. Although lean premixed combustion is cooler than diffusion combustion, the flame temperature is still too hot for prior conventional combustor components to withstand.

Furthermore, because the advanced combustors premix the maximum possible amount of air with the fuel for NOx reduction, little or no cooling air is available, making film-cooling of the combustor liner and transition piece premature at best. Nevertheless, combustor liners require active cooling to maintain material temperatures below limits. In dry low NOx (DLN) emission systems, this cooling can only be supplied as cold side convection. Such cooling must be performed within the requirements of thermal gradients and pressure loss. Thus, means such as thermal barrier coatings in conjunction with "backside" cooling have been considered to protect the combustor liner and transition piece from destruction by such high heat. Backside cooling involved passing the compressor air over the outer surface of the combustor liner and transition piece prior to premixing the air with the fuel.

With respect to the combustor liner, the current practice is to impingement cool the liner, or to provide turbulators on the exterior surface of the liner. Another more recent practice is to provide an array of concavities on the exterior or outside surface of the liner (see U.S. Pat. No. 6,098,397). The various known techniques enhance heat transfer but with varying effects on thermal gradients and pressure losses.

There remains a need for enhanced levels of cooling with minimal pressure losses and for a capability to arrange enhancements as required locally.

SUMMARY OF INVENTION

This invention provides convectively cooled combustor liner with cold side (i.e., outside) surface features that result in reduced pressure loss.

In the exemplary embodiment of this invention, grooves of a semi-circular or near semi-circular cross-section are formed in the cold side of the combustor liner, each groove being continuous or in discrete segments about the circumference of the liner. In one arrangement, the grooves are arranged transverse to the cooling flow direction, and thus appear as inverted or recessed continuous turbulators. These grooves act to disrupt the flow on the liner surface in a manner that enhances heat transfer, but with a much lower pressure loss than raised turbulators.

The turbulator grooves may also be angled to the flow direction to create patterned cooling which "follows" the hot side seat load. For example, in a premixed combustion can-annular system with significant hot gas swirl velocity, the hot side heat load is patterned according to the swirl strength and the location of the combustor nozzles.

The grooves are preferably circular or near circular in cross-section so that they do not present the same flow separation and bluff body effect of raised turbulators. The grooves must also be of sufficient depth and width to allow cooling flow to enter and form vortices, which then interact with the mainstream flow for heat transfer enhancement. The grooves may be patterned and/or also be cris-crossed to generate additional heat transfer enhancement.

Accordingly, in its broader aspects, the invention relates to a combustor liner for a gas turbine, the combustor liner having a substantially cylindrical shape; and a plurality of axially spaced circumferential grooves formed in an outside surface of the combustor liner.

In another aspect, the invention relates to a combustor liner for a gas turbine, the combustor liner having a substantially cylindrical shape; and a plurality of axially spaced circumferential grooves formed in an outside surface of the combustor liner; wherein the grooves are circular in cross-section, and have a diameter D, and wherein a depth of the grooves is equal to about 0.05 to 0.50D.

The invention will now be described in detail in conjunction with the following drawings.

DETAILED DESCRIPTION

Figure 1:
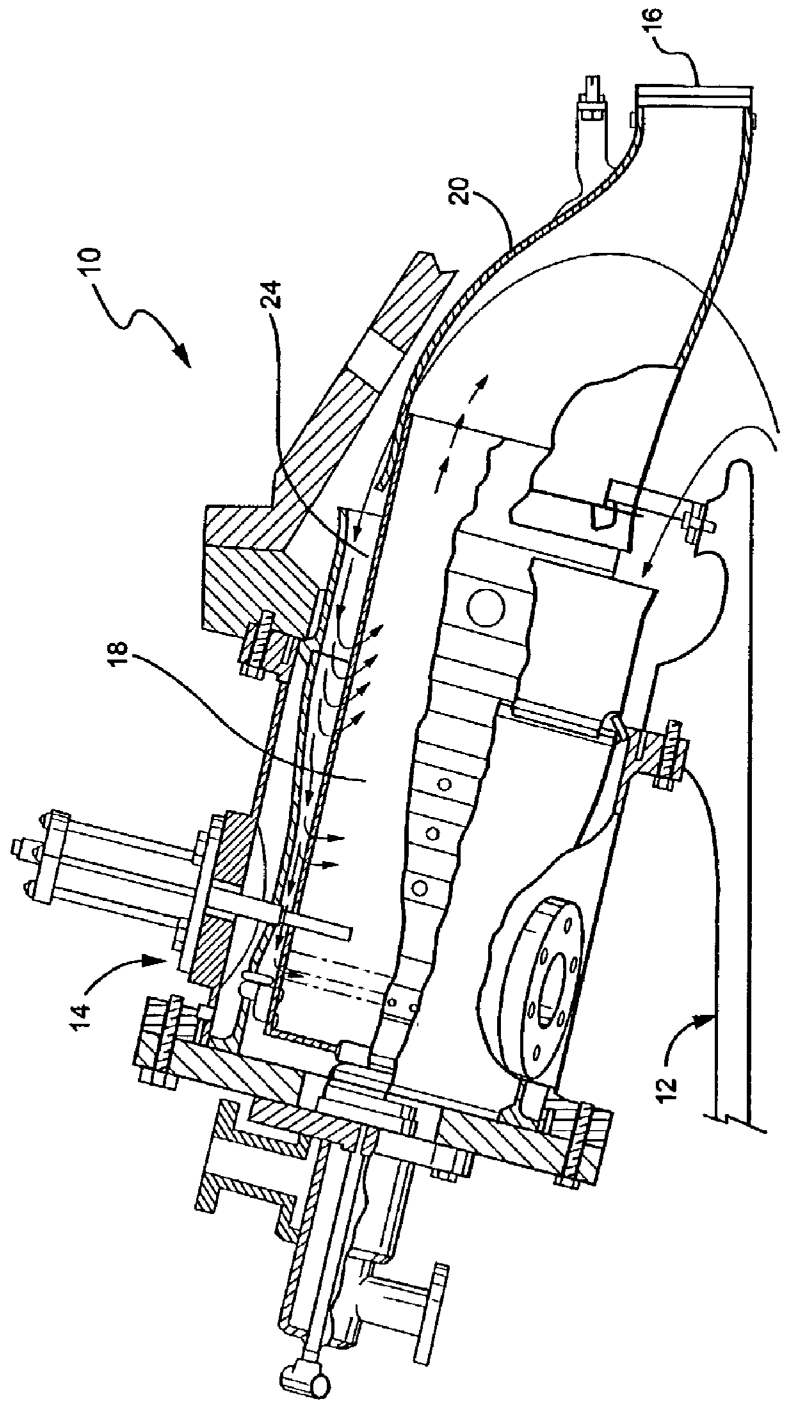
Fig. 1 (Prior Art)
FIG. 1 is a schematic representation of a known gas turbine combustor.

FIG. 1 schematically illustrates a typical can annular reverse-flow combustor 10 driven by the combustion gases from a fuel where a flowing medium with a high energy content, i.e., the combustion gases, produces a rotary motion as a result of being deflected by rings of blading mounted on a rotor. In operation, discharge air from the compressor 12 (compressed to a pressure on the order of about 250–400lb/in$^2$) reverses direction as it passes over the outside of the combustors (one shown at 14) and again as it enters the combustor en route to the turbine (first stage indicated at 16). Compressed air and fuel are burned in the combustion chamber 18, producing gases with a temperature of about 1500° C. or about 2730° F. These combustion gases flow at a high velocity into turbine section 16 via transition piece 20. The transition piece connects to the combustor liner 24 at 22, but in some applications, a discrete connector segment may be located between the transition piece 20 and the combustor liner.

In the construction of combustors and transition pieces, where the temperature of the combustion gases is about or exceeds about 1500° C., there are known materials which can survive such a high intensity heat environment without some form of cooling, but only for limited periods of time. Such materials are also expensive.

Figure 2:
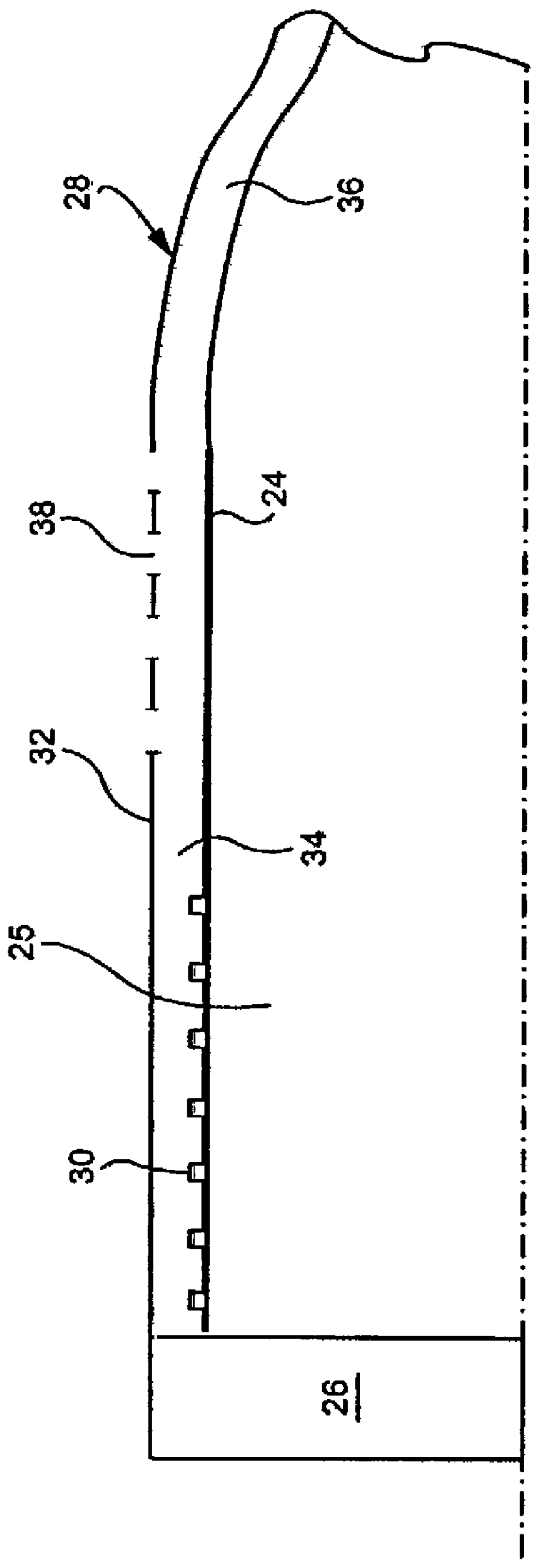
Fig. 2 (Prior Art)
FIG. 2 is a schematic view of a cylindrical combustor liner with turbulators.

FIG. 2 shows in schematic form a generally cylindrical combustor liner 24 of conventional construction, forming a combustion chamber 25.

In the exemplary embodiment illustrated, the combustor liner 24 has a combustor head end 26 to which the combustors (not shown) are attached, and an opposite or forward end to which a double-walled transition piece 28 is attached. Other arrangements, including single-walled transition pieces, are included within the scope of the invention. The liner 24 is provided with a plurality of upstanding, annular (or part-annular) ribs or turbulators 30 in a region adjacent the head end 26. A cylindrical flow sleeve 32 surrounds the combustor liner in radially spaced relationship, forming a plenum 34 between the liner and flow sleeve that communicates with a plenum 36 formed by the double-walled construction of the transition piece 28. Impingement cooling holes 38 are provided in the flow sleeve 32 in a region axially between the transition piece 28 and the turbulators 30 in the liner 24.

Figure 3:
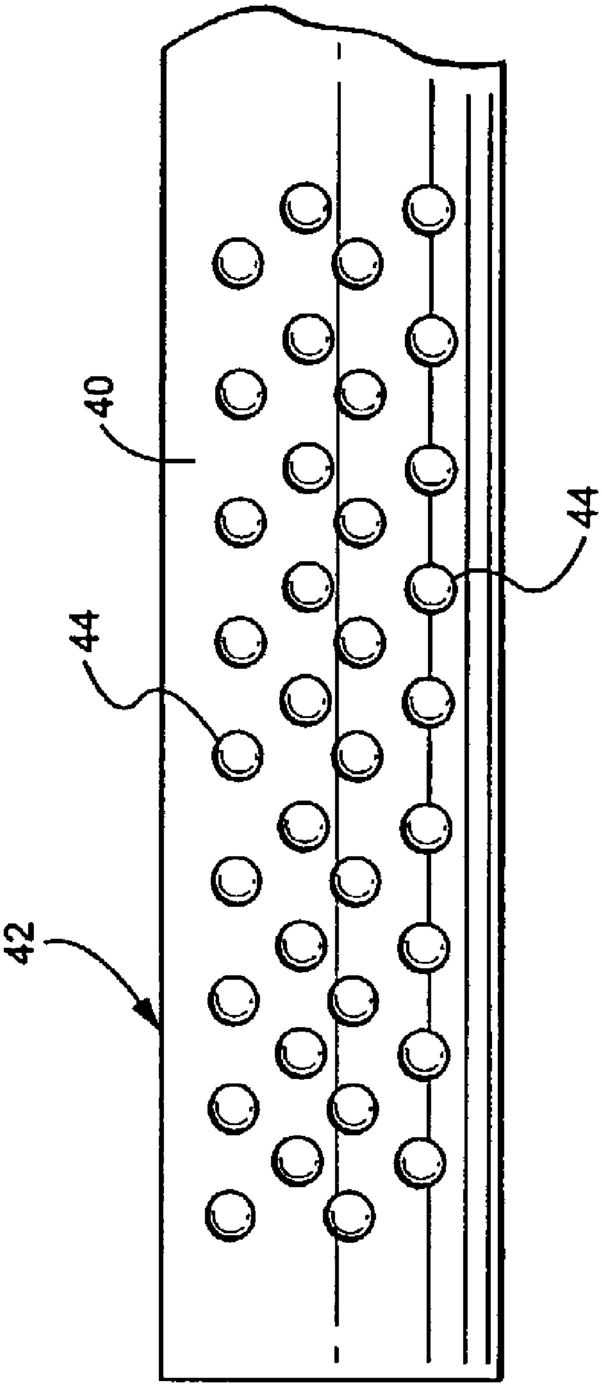
Fig. 3 (Prior Art)
FIG. 3 is a schematic view of a known cylindrical combustor liner with an array of concavities on the exterior surface thereof.

FIG. 3 illustrates in schematic form another known heat enhancement technique. In this instance, the exterior surface 40 of the combustor liner 42 is formed over an extended area thereof with a plurality of circular concavities or dimples 44.

Figure 4:
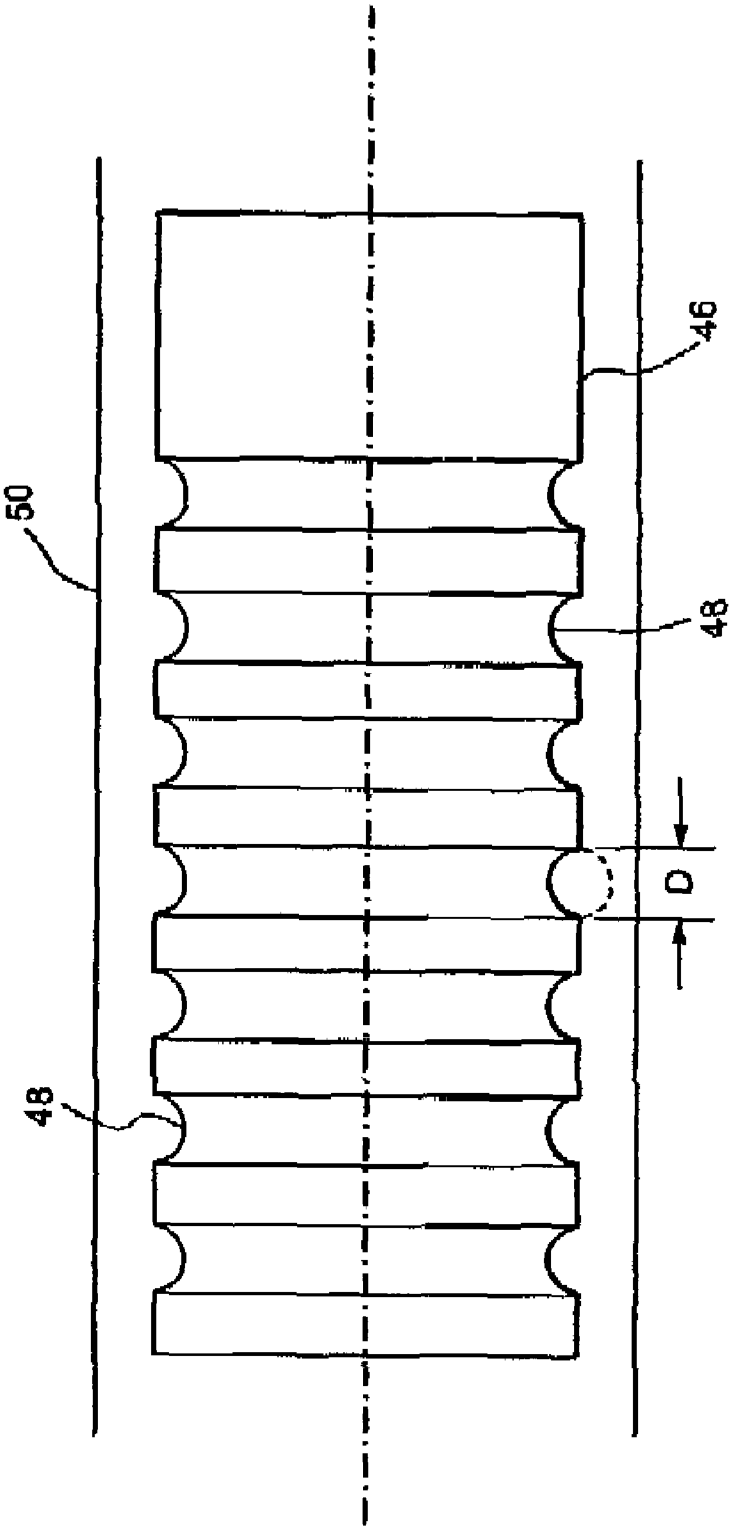
FIG. 4 is a schematic side elevation view of a cylindrical combustor liner with annular concave grooves in accordance with the invention.

Turning to FIG. 4, a combustor liner 46 in accordance with an exemplary embodiment of this invention is formed with a plurality of "inverted turbulators" 48. These "inverted turbulators" 48 comprise individual, annular concave rings or circumferential grooves, spaced axially along the length of the liner 46 with the concave surface facing radially outwardly toward the flow sleeve 50.

Figure 5:
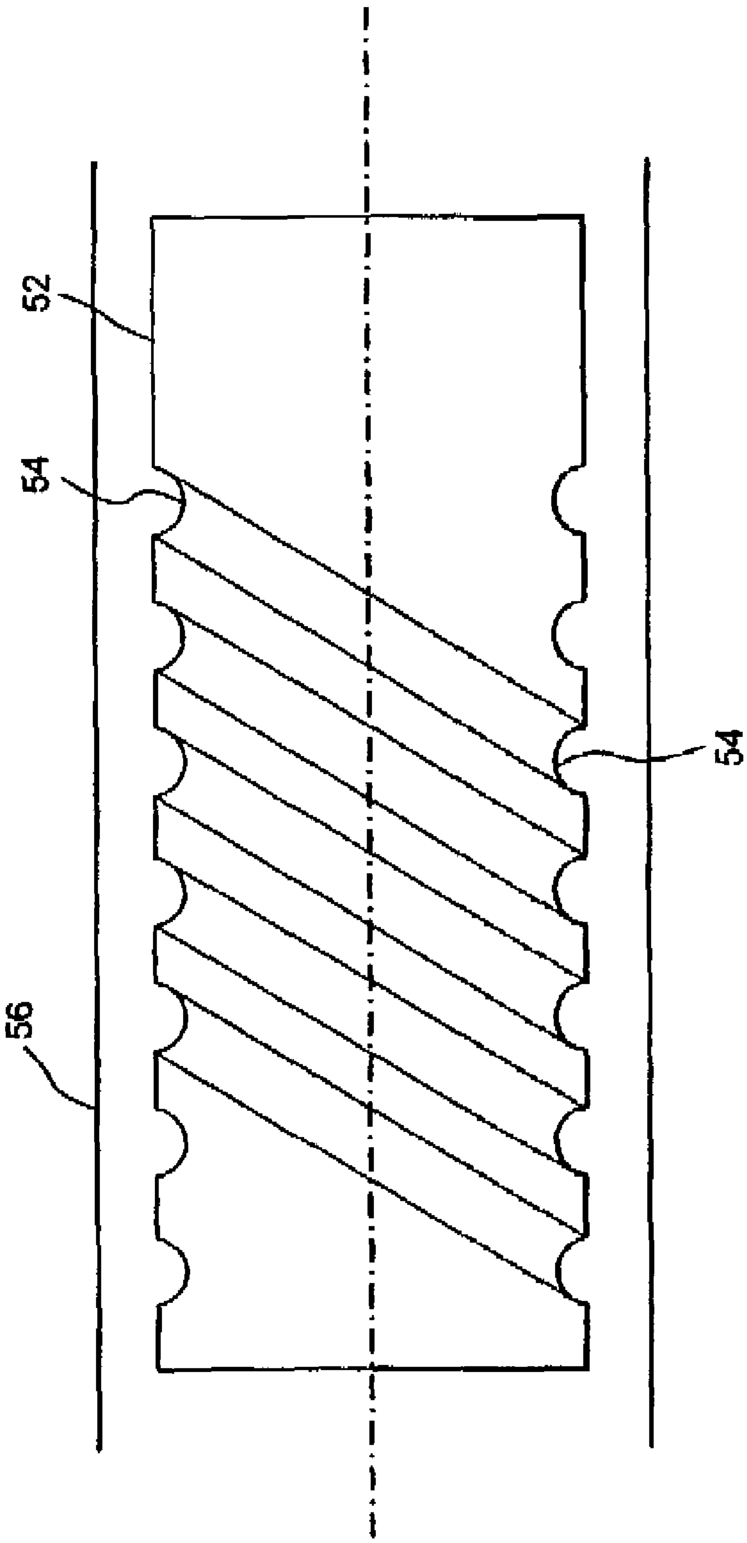
FIG. 5 is a schematic side elevation of a cylindrical combustor liner with angled annular concave grooves in accordance with another embodiment of the invention.

In FIG. 5, the liner 52 is formed with a plurality of similar circumferential grooves 54 that are angled to the flow direction to create patterned cooling which "follows" the hot-side heat load. Here again, the concave surfaces of the grooves face the flow sleeve 56.

For the arrangements shown in FIGS. 4 and 5, the semi-circular grooves are based on a diameter D, and have a depth equal to about 0.05 to 0.50D, with a center-to-center distance between adjacent grooves of about 1.5–4D. The depth of the grooves in a single liner may vary within the stated range.

These grooves act to disrupt the flow on the liner surface in a manner that enhances heat transfer, but with a much lower pressure loss than raised turbulators. Specifically, the cooling flow enters the grooves and forms vortices which then interact with the mainstream flow for heat transfer enhancement.

Figure 6:
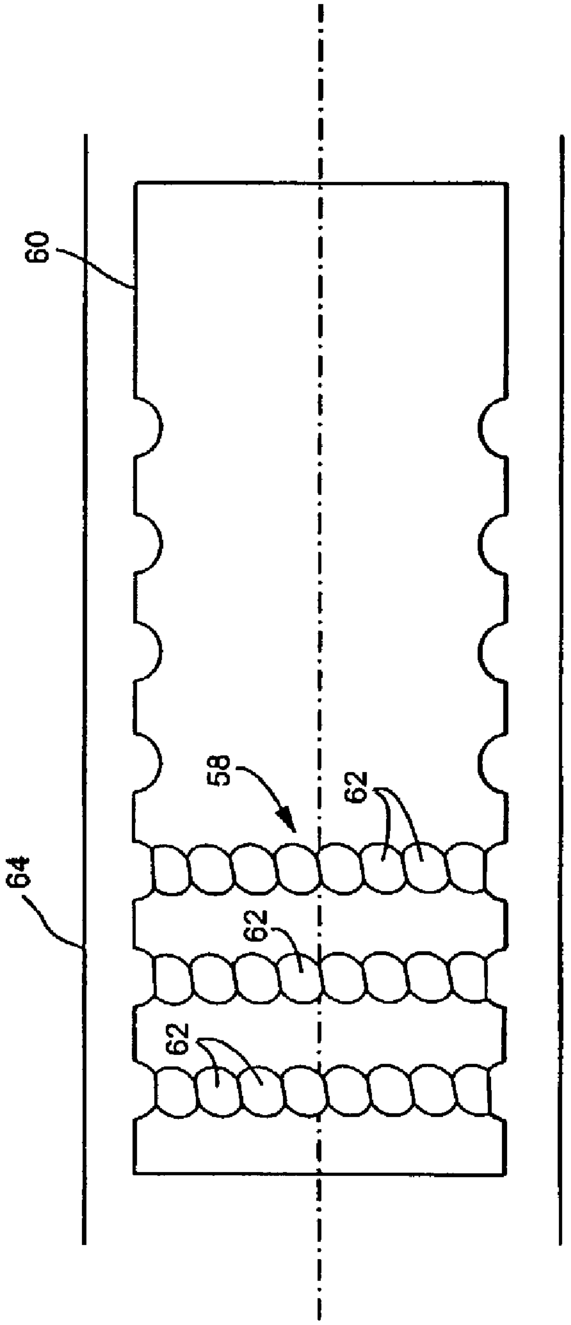
FIG. 6 is a schematic side elevation of a cylindrical combustor with annular patterned grooves in accordance with still another embodiment of the invention.

FIG. 6 illustrates, schematically, another embodiment of the invention where circumferential grooves 58 are formed in the combustor liner 60 facing the flow sleeve 64, but patterned to induce additional circumferential effects of thermal enhancement. Specifically, the grooves 58 are essentially formed by circumferentially overlapped, generally circular or oval concavities 62 with the concavities radially facing the flow sleeve 64. These patterned grooves could also be angled as in FIG. 5.

Figure 7:
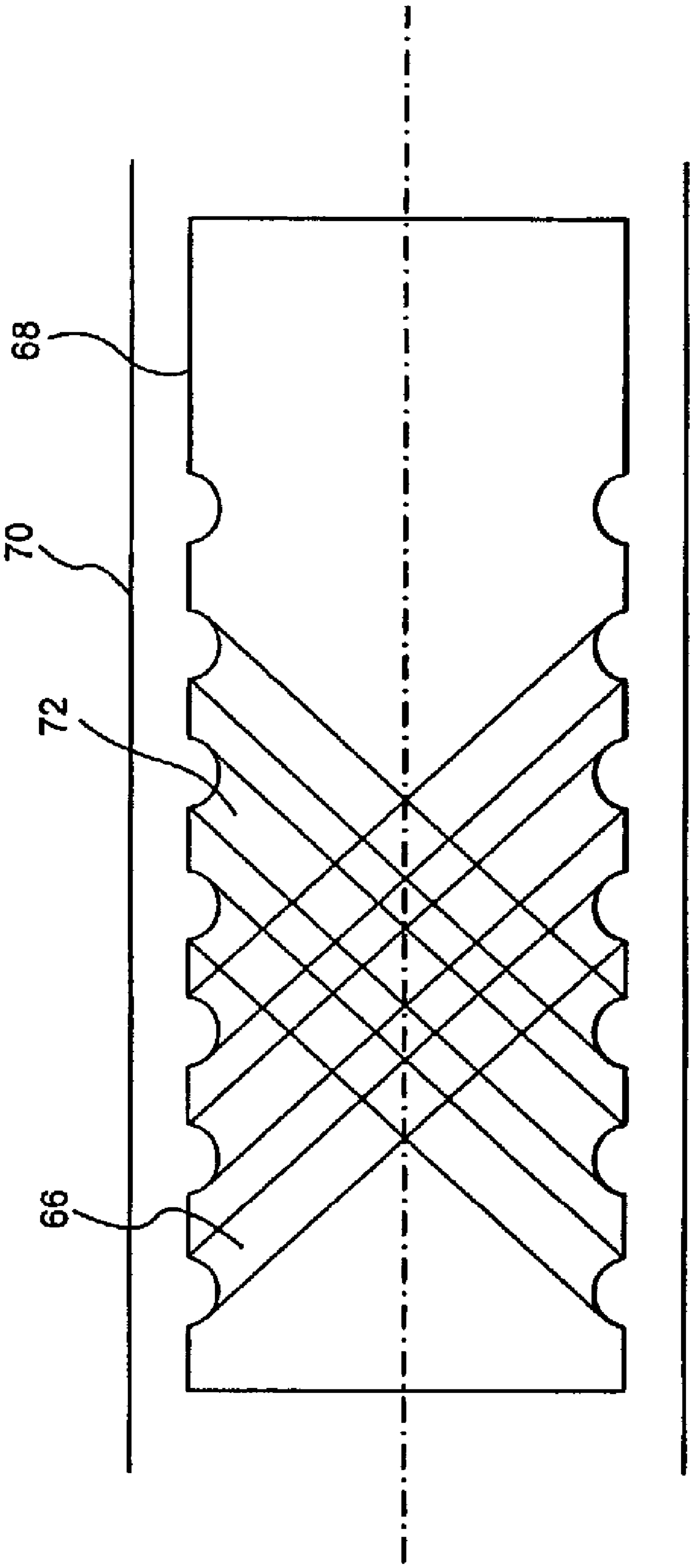
FIG. 7 is a schematic side elevation of a cylindrical combustor with annular criss-crossed grooves in accordance with still another embodiment of the invention.

In FIG. 7, concave, circumferential grooves 66 are formed in the combustor liner 68, facing the flow sleeve 70 are angled (i.e., at an acute angle relative to a center axis of the combustor liner) in one direction along the length of the liner, while similar grooves 72 are angled in the opposite direction, thus creating a criss-cross pattern of "inverted turbulators" to induce additional global effects of thermal enhancement. The criss-crossed grooves 66, 72 may be of uniform cross-section (as shown), or patterned as in FIG. 6.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A combustor liner for a gas turbine, the combustor liner having a substantially cylindrical shape; and a plurality of axially spaced annular grooves formed in an outside surface of said combustor liner, each groove having a uniform, substantially semi-circular cross-section and extending continuously about a circumference of said liner.

2. The combustor liner of claim 1 wherein said grooves are arranged transversely to a direction of cooling air flow.

3. The combustor liner of claim 1 wherein said grooves are angled relative to a direction of cooling air.

4. A combustor for a gas turbine, the combustor including a liner having a substantially cylindrical shape; a flow sleeve surrounding said liner; a first plurality of axially spaced, continuous circumferential grooves formed in an outside surface of said liner, angled relative to a direction of cooling air flowing between said liner and said flow sleeve; and a second plurality of axially spaced, continuous circumferential grooves cris-crossed with said first plurality of axially spaced circumferential grooves wherein said first and second plurality of axially spaced circumferential grooves are uniformly curved in cross-section.

5. A combustor liner for a gas turbine, the combustor liner having a substantially cylindrical shape; and a plurality of axially spaced annular grooves formed in an outside surface of said combustor liner, each groove extending continuously about a circumference of said liner; wherein said grooves are semi-circular in cross-section, based on a diameter D, and wherein a depth of said grooves is equal to about 0.05 to 0.50D.

6. The combustor liner of claim 5 wherein a center-to-center distance between adjacent grooves is equal to about 1.5–4D.

7. The combustor liner of claim 5 wherein said grooves are arranged transversely to a direction of cooling air flow.

8. The combustor liner of claim 5 wherein said grooves are angled relative to a direction of cooling air flow.

9. A combustor liner for a gas turbine, the combustor including a liner having a substantially cylindrical shape; a first plurality of axially spaced, continuous circumferential grooves formed in an outside surface of said liner, angled relative to a direction of cooling air flow; and a second plurality of axially spaced, continuous circumferential grooves cris-crossed with said first plurality of axially spaced circumferential grooves, and wherein said first and second plurality of axially spaced circumferential grooves are uniformly smoothly curved in cross-section.

* * * * *